United States Patent Office 2,967,782
Patented Jan. 10, 1961

2,967,782

INK OIL AND METHOD OF MANUFACTURE

Robert E. Manley, Yonkers, N.Y., assignor to Texaco Inc., a corporation of Delaware No Drawing. Filed Nov. 29, 1957, Ser. No. 699,456

9 Claims. (Cl. 106—311)

This invention relates to the manufacture of specialty oils. More particularly, this invention relates to the manufacture of ink oils such as are employed in the manufacture of printing inks and similar products.

Heretofore it has been the practice to prepare ink oils from selected charge stocks. Sometimes, however, the particular charge stock employed for the manufacture of ink oil may not be available in the desired quantities.

Accordingly, it is an object of this invention to provide a process for the manufacture of ink oil wherein the manufacture of ink oil is not dependent upon a particular selected charge stock.

Still another object of this invention is to provide an improved process for the manufacture of ink oil.

Yet another object of this invention is to provide a satisfactory ink oil obtainable from readily available refinery stocks.

Still another object of this invention is to provide an oil and method of manufacturing the same, which oil is suitable for use in the manufacture of printing ink oil.

How these and other objects of this invention are accomplished will become apparent with reference to the accompanying disclosure.

In accordance with this invention it has now been determined that a satisfactory ink oil, suitable for use in the preparation of printing inks, is obtainable or derivable from readily available petroleum stocks. More particularly, in accordance with the practice of this invention an ink oil is manufactured from a waxy distillate fraction, such as may be derivable from a paraffin base crude, by selectively refining said waxy distillate fraction to separate therefrom an aromatic extract fraction, acid treating said aromatic extract fraction and neutralizing the resulting acid treated extract fraction. Desirably, there may be admixed with the resulting acid treated, neutralized fraction a minor amount of a distillate fraction of a naphthene base oil and, if required, an amount of a pour point depressant sufficient to reduce the pour point of the resulting admixture or blend of oils to a relatively low value, e.g., at least +30° F.

The aromatic extract employed in the manufacture of ink oil in accordance with the practice of this invention is suitably derived from a waxy distillate fraction such as a waxy distillate fraction having a viscosity in the range 150 SUS at 100° F. to 93 SUS at 210° F. Desirably the charge oil should have a relatively high flash point, such as a flash C.O.C. in at least the range 400–535° F. Advantageously also the pour point of the waxy distillate fraction should be relatively low such as in the range —10° F. to +5° F., more or less.

In the solvent refining operation for the recovery of an aromatic extract from the charge oil any selective solvent which preferentially dissolves aromatic hydrocarbons and which is at least partially immiscible with the charge oil under the conditions of contacting might be employed. Suitable selective solvents include liquid sulfur dioxide, furfural, phenol or a mixture of phenols (Selecto), $\beta,\beta'$-dichloroethylether (Chlorex), nitrobenzene and the like. Conventional solvent refining operations and equipment are employed in the preparation of an aromatic extract fraction in the practice of this invention.

The resulting aromatic extract fraction, after removal of the selective solvent therefrom, is then acid treated. Sulfuric acid is preferred as the treating acid. Sulfuric acid in an amount in the range 5–40 lbs. per barrel of oil undergoing treatment is usually sufficient. Concentrated sulfuric acid, i.e., at least 90% $H_2SO_4$, preferably at least about 98% $H_2SO_4$, e.g., such as black acid from a $H_2SO_4$ alkylation operation, is usually employed. Other strong mineral acids are also suitable such as concentrated hydrofluoric and concentrated phosphoric acid. The resulting acid treated extract is then neutralized with a suitable neutralizing agent for the removal of any free residual acid. Suitable neutralizing agents include sodium carbonate or sodium bicarbonate or the alkali metal hydroxides such as sodium hydroxide.

The resulting acid treated, neutralized extract, for the preparation of an ink oil, is then admixed or blended with another acid treated, neutralized extract or with a minor amount of a suitable naphthene base distillate oil such as a naphthene base oil having a viscosity in the range 72–310 SUS at 100° F. and possessing a relatively low pour point, such as a pour point in the range —50 to —20° F.

Also, if required, there is added to the admixture comprising a major amount of acid treated, neutralized extract, at least 80% by volume of the admixture, usually in the range 90–99.5% vol., and a minor amount, generally not more than 20% by volume of the admixture, usually in the range 3–20% vol., of a naphthene base oil, a very minor amount, in the range 0.05–1.5% vol., of a suitable pour point depressant. Suitable pour point depressants include an alkylated naphthalene such as may be prepared from the treatment of chlorinated wax and naphthalene with aluminum chloride. This alkylate naphthalene is usually a viscous liquid having a relatively high flash point, at least about 425° F., a viscosity in the range 100–170 SUS at 210° F. In the practice of this invention any of the conventionally available pour point depressants may be employed.

The finished ink oil, as indicated hereinabove, comprises an acid treated, neutralized relatively aromatic extract derived from the solvent refining of a waxy distillate fraction, preferably together with a naphthene base distillate oil and, if desirable, a pour point depressant. A blend of acid treated, neutralized aromatic extracts derived from waxy distillates, together with a pour point depressant, if required, might comprise an ink oil. Accordingly, the presence of a minor amount of a naphthene base distillate oil fraction might be avoided.

The following data set forth in the accompanying tables are illustrative of the practice of this invention. More particularly, as indicated in the accompanying tables a waxy petroleum distillate fraction was furfural solvent refined and the resulting furfural-free extract acid treated and neutralized. The resulting acid treated, neutralized extract was then, in one instance, blended with a minor amount of a naphthene base distillate oil and in another instance with an acid treated, neutralized extract derived from another waxy petroleum distillate. In both instances, however, a pour point depressant, an alkylated naphthalene obtained from the treatment of a chlorinated wax and naphthalene with aluminum chloride, was added in a minor amount. The resulting ink oil blends were then subjected to various tests to determine the suitability of the particular blend as an ink oil. In each of the blends tested the ink oils were satisfactory.

The operating conditions employed in the foregoing operations, the characteristics of the various charge stocks employed and the test data obtained are set forth in the accompanying tables wherein Table I sets forth the solvent refining and after treating conditions, Table II the laboratory tests and characteristics of the charge stocks and resulting treated extract, Table III the characteristics of one of the ink oil blends manufactured, Table IV the characteristics of another ink oil manufactured in accordance with this invention and Table V the test data of the ink oils prepared in accordance with this invention.

As indicated in the accompanying data, satisfactory ink oils are obtained by solvent treating or refining a waxy petroleum distillate to recover an extract therefrom characterized by a relatively increased proportion of aromatic hydrocarbons with respect to said waxy petroleum distillate, then acid treating and neutralizing the resulting extract and employing the resulting treated extract in the manufacture of a printing ink oil and printing ink.

As will be apparent to those skilled in the art many substitutions, alterations and modifications may be employed without departing from the spirit or scope of this invention.

TABLE I
FURFURAL REFINING

| Charge Stock | Oil A | Oil B |
|---|---|---|
| Charge Rate, BPOD | 8,763 | 6,321 |
| Refined Oil Yield, Percent Vol., Basis Charge | 76.9 | 69.2 |
| Extract Yield, Percent Vol., Basis Charge | 23.1 | 30.8 |
| Solvent Dosage, Percent Vol., Basis Oil Charge | 263 | 253 |
| Refined Oil Mix Out, °F | 236 | 234 |
| Extract Mix Out, °F | 166 | 187 |
| Extract Recycle Ratio, Bbl./Bbl. Oil Charge | 161 | |

ACID TREATING
Furfural Extract from—

| Charge Stock | Oil A | Oil B |
|---|---|---|
| Yield, Percent Vol., Basis Acid Treating | 83.9 | 62.8 |
| Acid Used | 98% Black | 98% Black |
| Acid Dosage, Lb. Acid/Bbl. Oil: | | |
|   Pre-Treat | 4 | 4 |
|   Treat | 14 | 14 |
| Treating Temp., °F | 120 | 118 |
| Neutralized With | Soda Ash | Soda Ash |

TABLE II

| | Charge Oil | | Furfural Extract | | Acid Treated Extract From— | |
|---|---|---|---|---|---|---|
| | Oil A | Oil B | Oil A | Oil B | Oil A | Oil B |
| Gravity, °API | 29.3 | 25.9 | 14.1 | 13.5 | 15.0 | 15.1 |
| Flash, COC., °F | 405 | 450 | 405 | 430 | 405 | 435 |
| Fire, OC., °F | | 500 | 460 | 505 | 455 | 495 |
| Viscosity: | | | | | | |
|   SUS at 100° F | | 397 | | | 491 | 1,740 |
|   SUS at 130° F | | | | | 187 | 526 |
|   SUS at 150° F | | 116.2 | 126.3 | 365 | | |
|   SUS at 210° F | 42.6 | 55.2 | 53.0 | 88.1 | 51.6 | 77.4 |
| Viscosity Index | | | | | | |
| Color, Lovibond ½° Cell | 40 | 170 | | | | |
| Color, Tag-Robinson | | | ¾ | ¾ | 2.0 | 1½ |
| Pour, °F | | +90 | +40 | +65 | +20 | +60 |
| Carbon Residue, Percent | 0.01 | 0.10 | 0.12 | 0.58 | 0.13 | 0.85 |
| Ash, Percent | | None | 0.001 | 0.002 | 0.002 | 0.005 |
| Sulfur, Percent | 0.34 | 0.24 | 0.91 | 0.86 | 0.81 | 0.82 |
| Neutralization No | 0.10 | 0.30 | 0.30 | 1.00 | 0.12 | 0.08 |

Naphthene Base Oil Additive:
  Gravity, °API _____ 22–25.
  Flash, COC, °F _____ 290 min.
  Fire, COC, °F _____ 330 min.
  Viscosity, SSU at 100° F _____ 70–75.
  Color, Lovibond 6″ Cell _____ 25–50.
  Pour, °F _____ −40 max.
  Neutralization No _____ 0.1 max.
  Ash, Percent _____ 0.003 max.
  Corrosion, Cu Strip 3 hrs. at 212° F _____ Negative.

TABLE III
Ink oil No. 1 formulation and properties

Base Stock:
  (1) Treated Furfural Extract From Oil A, Volume Percent _____ 95.0
  (2) Naphthene Base Oil, Volume Percent _____ 5.0
  _____ 100.0

Final Blend:
  (1) Base Stock, Weight Percent _____ 99.9
  (2) Alkylated naphthalene obtained by treating chlorinated wax and naphthalene with $AlCl_3$, Weight Percent _____ 0.1
  _____ 100.0

| Laboratory Tests: Final Blend | | Acceptable |
|---|---|---|
| Gravity, °API | 15.5 | 22 Max. |
| Flash, COC., °F | 400 | 325 Min. |
| Fire, OC., °F | 455 | |
| Viscosity: | | |
|   SUS at 100° F | 432 | 400 approx. |
|   SUS at 130° F | 168.8 | |
|   SUS at 210° F | 49.9 | |
| Color, Tag-Robinson | 1¾ | 1.0 Min. |
| Pour, °F | −5 | +30 Max. |
| Odor | Not objectionable | Not objectionable. |
| Carbon Dispersion | O.K., Slight Oil Film on Top. | Mixtures with carbon black should show no appreciable separation, gelation nor thickening on standing. |

TABLE IV
Ink oil No. 2 formulation and properties

Base Stock:
  (1) Treated Furfural Extract From Oil B, Volume Percent _____ 59.0
  (2) Treated Furfural Extract From Oil A, Volume Percent _____ 41.0
  _____ 100.0

Final Blend:
  (1) Base Stock, Weight Percent _____ 99.8
  (2) Alkylated naphthalene obtained by treating chlorinated wax and naphthalene with $AlCl_3$, Weight Percent _____ 0.2
  _____ 100.0

| Laboratory Tests: Final Blend | | Acceptable |
|---|---|---|
| Gravity, °API | 15.0 | 22 Max. |
| Flash, COC., °F | 420 | 340 Min. |
| Fire, OC., °F | 475 | |
| Viscosity: | | |
|   SUS at 100° F | 805 | 750 approx. |
|   SUS at 130° F | 279 | |
|   SUS at 210° F | 59.3 | |
| Color, Tag-Robinson | 1⅝ | 1.0 Min. |
| Pour, °F | +10 | +10 Max. |
| Odor | Not objectionable | Not objectionable. |
| Carbon Dispersion | O.K., Slight Oil Film on Top. | Mixtures with carbon black should show no appreciable separation, gelation nor thickening on standing. |

TABLE V
Tests on ink oils

| | Ink Oil No. 1 | Ink Oil No. 2 |
|---|---|---|
| Heat Stability Test, 7 days at 180° F.: | | |
|   Color, T.R.: | | |
|     Initial | 1¾ | 1⅝ |
|     3 days | 1½ | 1½ |
|     5 days | 1½ | 1½ |
|     7 days | 1.0 | 1.0 |
| 5% Carbon Black Mix aged 164 hrs. at 120° F.: Separation, percent. | slight oil film on top. | slight oil film on top. |

I claim:

1. A process for the manufacture of ink oil which comprises contacting a waxy petroleum distillate fraction with liquid furfural as a selective solvent which selectively dissolves the more aromatic hydrocarbons therefrom, said selective solvent being at least partially immiscible with said petroleum distillate fraction under the conditions of contacting, to yield an extract characterized by a relatively increased proportion of aromatic hydrocarbons as compared with said distillate fraction, contacting said extract with concentrated sulfuric acid, neutralizing the resulting treated oil with a neutralizing agent for sulfuric acid selected from the group consisting of sodium carbonate, sodium bicarbonate and sodium hydroxide and admixing the resulting acid treated, neutralized extract with a minor amount in the range 3–20% vol. of a naphthene base oil and a minor amount in the range 0.05–1.5% vol. of a pour point depressant to yield a finished ink oil, said ink oil having an API gravity not in excess of 22, a Tag-Robinson color of at least 1.0, a pour point not in excess of +30° F., which ink oil upon admixture with carbon black, wherein carbon black comprises about 5% by weight of the admixture, shows no appreciable oil separation, gel formation or thickening after aging about 164 hours at 120° F.

2. An ink oil obtained by acid treating and neutralizing a furfural extract derived from a waxy petroleum distillate consisting essentially of a major amount of an acid treated, neutralized extract and a minor amount in the range 3–20% vol. of a naphthene base oil and an amount of a pour point depressant in the range 0.05–1.5% vol. of the resulting ink oil, said ink oil being characterized by the following properties:

Gravity, ° API—not in excess of 22
Flash, COC, ° F.—at least 340
Viscosity, SUS at 100° F.—in the range 350–850
Color, Tag-Robinson—at least 1.0, which ink oil upon admixture with carbon black, wherein the admixture contains about 5% by weight carbon black, exhibits no appreciable oil separation, gel formation or thickening upon aging at 120° F. for at least 164 hours.

3. A process for the manufacture of ink oil which comprises contacting a waxy petroleum distillate fraction with liquid furfural as a selective solvent which selectively dissolves the more aromatic hydrocarbons therefrom to yield an extract characterized by a relatively increased proportion of aromatic hydrocarbons as compared with said distillate fraction, acid treating and neutralizing said extract, and admixing the resulting acid treated, neutralized extract with a minor amount in the range 3–20% vol. of a naphthene base oil and a minor amount in the range 0.05–1.5% by vol. of a pour point depressant to yield a finished ink oil, said ink oil having an API gravity not in excess of 22, a Tag-Robinson color of at least 1.0, a pour point not in excess of +30° F., which ink oil upon admixture with carbon black, wherein carbon black comprises about 5% by weight of the admixture, shows no appreciable oil separation, gel formation or thickening after aging for about 164 hours at 120° F.

4. A process in accordance with claim 3 wherein said waxy petroleum distillate has a viscosity in the range 150 SUS at 100° F. to 93 SUS at 210° F.

5. A process in accordance with claim 3 wherein concentrated sulfuric acid is employed to acid treat said extract, wherein sodium carbonate is employed to neutralize the resulting acid treated extract, wherein the naphthene base oil comprises about 5% by weight of the finished ink oil and wherein the pour point depressant comprises about 0.1% by weight of the finished ink oil.

6. A process in accordance with claim 3 wherein said naphthene base oil has a viscosity in the range 72 through 310 SUS at 100° F. and wherein said pour point depressant is an alkylated naphthalene.

7. An ink oil obtained by acid treating and neutralizing a relatively aromatic extract derived from a waxy petroleum distillate consisting essentially of a major amount of an acid treated, neutralized extract and a minor amount in the range 2–15% by volume of a naphthene base oil and an amount of a pour point depressant in the range 0.05–1.5% by vol. of the resulting ink oil, said ink oil being characterized by the following properties:

Gravity, ° API—less than 22
Flash, COC, ° F.—at least 340
Color, Tag-Robinson—at least 1.0, which ink oil upon admixture with carbon black, wherein the admixture contains about 5% by weight carbon black, exhibits no appreciable oil separation, gel formation or thickening upon aging at 120° F. for at least 164 hours.

8. An ink oil in accordance with claim 7 wherein said naphthene base oil has a viscosity in the range 72 through 310 SUS at 100° F.

9. An ink oil consisting essentially of an acid treated, neutralized extract derived from the furfural solvent refining of a waxy petroleum distillate and a minor amount in the range 0.05–1.5% vol. of a pour point depressant, said ink oil being characterized by the following properties:

Gravity, ° API—less than 22
Flash, COC, ° F.—at least 340
Color, Tag-Robinson—at least 1.0
Pour point, ° F.—less than 30
Viscosity, SUS at 100° F.—approximately in the range 400–800, which ink oil upon admixture with carbon black, wherein the admixture contains about 5% by weight carbon black, exhibits no appreciable oil separation, gel formation or thickening upon aging at 120° F. for at least 164 hours.

References Cited in the file of this patent
UNITED STATES PATENTS

| Number | Name | Date |
|---|---|---|
| 547,294 | Salathe | Oct. 1, 1895 |
| 1,871,694 | Ihrig | Aug. 16, 1932 |
| 1,990,466 | Allan | Feb. 12, 1935 |
| 2,003,238 | Bennet | May 28, 1935 |
| 2,045,806 | Sloane | June 30, 1936 |
| 2,081,498 | Merrill | May 25, 1937 |
| 2,246,376 | Lynch | June 17, 1941 |
| 2,453,558 | Voet | Nov. 9, 1948 |

OTHER REFERENCES

Ellis: "Printing Inks," 1940, page 222, lines 6–8.
New Solvents for Intaglio Inks, Paint Manufacture, vol. 2, No. 10 (1932), page 266.